United States Patent
Pishock, Jr. et al.

(10) Patent No.: US 7,407,218 B1
(45) Date of Patent: Aug. 5, 2008

(54) TRAILER EXTERNAL SMOOTH SIDE ASSEMBLED WITH STRUCTURAL MODULES

(76) Inventors: Charles T. Pishock, Jr., One Summit Plaza, Summit Station, PA (US) 17979; John J. Mootz, 97 McKinley St., Sch. Haven, PA (US) 17972

( * ) Notice: Subject to any disclaimer, the term of this patent is extended or adjusted under 35 U.S.C. 154(b) by 5 days.

(21) Appl. No.: 11/796,705

(22) Filed: Apr. 30, 2007

Related U.S. Application Data

(60) Provisional application No. 60/801,022, filed on May 18, 2006.

(51) Int. Cl.
  *B62D 25/02* (2006.01)
(52) U.S. Cl. .............. 296/186.1; 296/193.04; 52/588.1; 52/591.1
(58) Field of Classification Search .......... 296/29, 296/193.04, 186.1, 182.1, 184.1; 52/588.1, 52/589.1, 591.1
  See application file for complete search history.

(56) References Cited

U.S. PATENT DOCUMENTS

| | | | | | |
|---|---|---|---|---|---|
| 2,926,928 | A | * | 3/1960 | Bennett | 280/423.1 |
| 3,116,950 | A | * | 1/1964 | Chieger et al. | 296/184.1 |
| 3,380,216 | A | * | 4/1968 | Spence | 52/592.4 |
| 3,411,261 | A | * | 11/1968 | Soddy | 52/588.1 |
| 3,420,028 | A | * | 1/1969 | Barker | 52/588.1 |
| 5,170,605 | A | * | 12/1992 | Huddle | 52/588.1 |
| 5,351,990 | A | * | 10/1994 | Thomas | 280/789 |
| 7,021,012 | B2 | * | 4/2006 | Zeng et al. | 52/177 |
| 2005/0062314 | A1 | * | 3/2005 | Searfoss | 296/186.1 |
| 2007/0080561 | A1 | * | 4/2007 | Lemmons | 296/182.1 |

* cited by examiner

*Primary Examiner*—Jason S Morrow
(74) *Attorney, Agent, or Firm*—A. R. Eglington

(57) ABSTRACT

A trailer sidewall structural system comprises a plurality of interconnecting modules, with each module having a dissimilarly configured, pair of opposing elongate, lateral edges. Such pair of lateral edges are configured so as to have a first edge of a first module, engage and interlock with a complemental second edge of an abutting second module, the modules being otherwise identical. The complemental lateral lengths of each module form a pair of opposing keyways, that permit interlocking of the lateral edges of two otherwise identically configurated, planar modules, thus providing for a variable length of modules, as may be dictated by the longitudinal dimensions required of a trailer sidewall, and the transverse dimensions of each such module are being adapted to be secured to the deck and top rails located along the trailer sidewalls.

3 Claims, 2 Drawing Sheets

TRAILER EXTERNAL SMOOTH SIDE ASSEMBLED WITH STRUCTURAL MODULES

CROSS REFERENCE TO OTHER APPLICATIONS

This is a non-provisional patent application filed under patent Code Section 111 (a) for purposes of an Official Receipt, It claims priority from copending provisional specification filed May 18, 2006 as Appl. No. 60/801,022. Confirmation No. (6890)

BACKGROUND OF THE INVENTION

Over the road trailer-tractors are a major single factor in our industrial economy and they contribute to the prompt and economical transport of goods throughout this nation. The separatable element (usually a multi-wheeled entity) undergoes many hauls that is sometimes switched from tractor to tractor. Efficient and durable fabrication of trailers is a major construction industry. A means to permit fabrication of trailer sidewalls of variable length and durability is an important business goal. There is an existing industry for the building of trailers from rigid-metallic panels, or modules, having standardized dimensions. While the abutting panel heights may be commonly matched, the sidewall lengths depend upon the number of modules arrayed, and interlocked, and needed to produce a given length of a trailer sidewall.

Interlocking, along lateral vertical edges, of the modules is a feature crucial to present smooth, sidewall products. Smooth sidewalls reduce air drag and improve road mileage of tractor-trailers. Fabricating sidewall modules is a chore of continuing concern, to combine reasonable cost, to foster efficient assembly of the abutting panels, and to provide for long-term sidewall durability, given the over-the-road physical stressors that burden trailer longevity.

SUMMARY OF THE INVENTION

According to the invention, there is presented a rigid metallic module adapted to engage a like second metallic module both serving to form a first segment of a linear sidewall, with the sidewall further adapted to be positioned to the deck of a trailer that provides a cargo carrying space, each such module further comprising: (a) an elongate, generally planar, and essentially rectangular central panel of the first module having two parallel and opposing lateral lengths, the first of which lateral lengths is configured, when viewed in horizontal cross-section, to present a first bead composed of a sloping and L-shaped bulged configuration, adapted to engage securely with; (b) a complementally configured lateral length of the similarly sized and, abutting second module, the second lateral length of which, when viewed in cross-section, is adapted to present, a second bead which presents an inverse sloped, L-shaped recess throughout the linear length of the said second bead thereof, having a rounded projection, adapted to seat in the linear recess of the first lateral length of the first panel, such that when the dissimilarly configured piece of the adjacent modules are properly engaged and interlocked, they will present an external generally planar surface throughout, which modules are adapted to be bonded along their shorter transverse dimensions to the underlying horizontal deck of a trailer and concurrently to the linear toprail of the sidewall.

OBJECTS OF THE INVENTION

The principal object of the invention is to provide a smooth-side elongate, pair of trailer sidewalls that minimize frictional air resistance when the tractor-trailer rig is moving down the highway at operational speeds, thereby aiding improved fuel mileage.

Another object of the invention is to construct a set of trailer sidewalls that are adapted for load-bearing and that are erected from a plurality of modular units, each component module being extruded from one specially designed, aluminum metal extrusion die.

Still another object is to provide for convenient coupling of abutting sidewall modules that will result in a linear array of modules that readily seat in the trailer side rails.

A further object is to provide an assembled module array that could be handily accessed to remove and replace any one or more modules damaged and/or destroyed that may arise upon a trailer collision so to restore sidewall integrity.

DETAILED DESCRIPTION OF A PREFERRED EMBODIMENT

Figure 1:
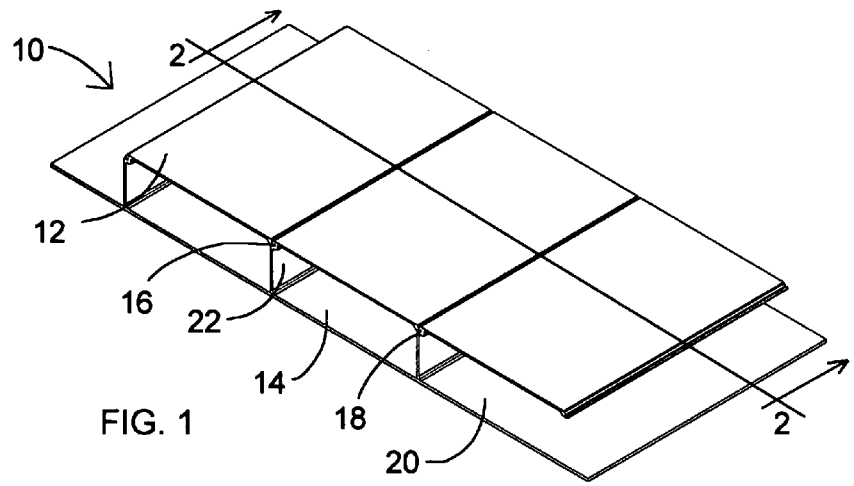
FIG. 1 is a perspective, and somewhat rotated view, of a preferred embodiment of an improved sidewall structural system of the present invention, (transverse dimension) which features improved interlocking, elongate linear edges for purposes of trailer side panel construction.

Referring now to the drawing, and to FIG. 1 in particular, in which like numerals indicate like elements, around the several views discussed here, there is depicted a presently preferred, embodiment of an extruded and improved trailer sidewall, structural assembly 10 of the present invention, which assembly, comprises a number of improved structurally rigid modules. The depicted embodiment includes a left hand integrally structural module 12, which is conjoined along one of its lateral dimensions to an identical elongate module 14, but which later module is provided with a complemental lateral edge 16 (to be discussed). Module 14 in turn, is conjoined along its opposing lateral edge 18 to a like third structural module 20. It will be apparent that the three depicted and conjoined modules (seen in linear array), can be extended by the conjoining of like other panels (not seen), to provide an extended linear and planar, structural system, as desired. Such is adapted to be used in the serial fabrication of sidewalls for transport trailers, as well as for erecting trailer sidewalls of a variety of body lengths.

Figure 2:
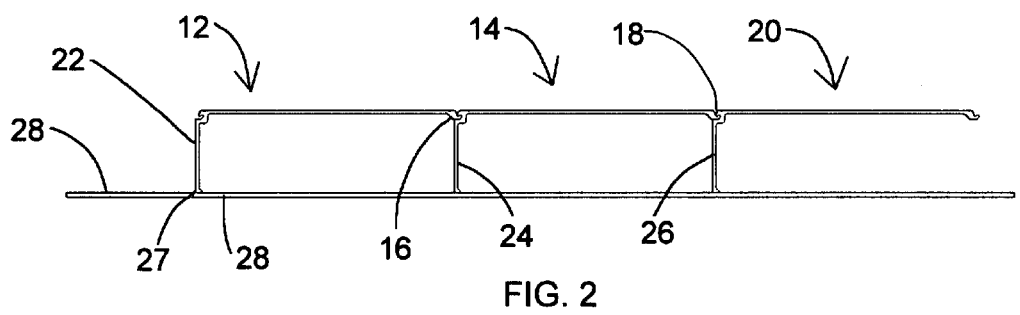
FIG. 2 is a horizontal cross sectional view, taken along line 2-2 of FIG. 1, of an improved module presenting the somewhat dissimilar, but complemental, transverse edge configurations, along the opposing lateral module side, also depicting how the novel outfacing modules are mounted on the supporting contiguous inner sidewall of a trailer.

In the fragmentary horizontal cross-sectional view of the present structural assembly FIG. 2, the manner of interconnection of three modules, 12, 14, and 20 can be better seen. Each module has at a right angle, a lateral spacer leg, 22, 24, and 26, respectively. The spacer leg extends from adjacent the first bead inwardly of a trailer assembly to engage the inner sidewall (28 in FIG. 2). These legs are affixed at their left side, free longitudinal ends, (like 16), usually by ARC welding, to the continuous vertical inner sidewall 28 (depicted here as an underlying planar surface), which inner sidewall is a known continuous elongate support panel, and is not a part of the present invention. It will be evident that the multiple modules, like 12, and their spaced-apart supporting inner sidewalls like 28, can be extended to effect planned, linear lengths of the external trailer sidewalls (not seen), with the exposed sidewall being constructed primarily from these novel modules.

The modules of the invention are conveniently fabricated in aluminum metal extrusion plants, with the dies being tailored to give the cross-sectional configuration of the here-depicted module of the present invention. The technology of such fabricated parts are within the skill of the art, such vendors as Alcoa Engineered Products of Cressona, Penna.

Figure 3:
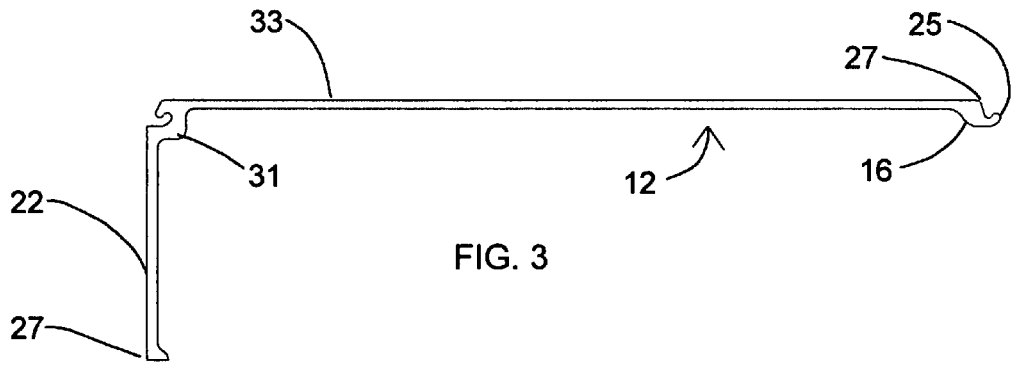
FIG. 3 is a full horizontal cross-sectional view of one exemplary panel-like module of this invention, including the single, right angled, linear projection which extends from the left hand, longitudinal end of the module, and which leg-like projection is adapted to seat and bond rigidly upon an inner side linear sidewall; (seen in FIG. 2)

FIG. 3, is the enlarged, horizontal cross-sectional view of module 12, which better shows the specific configuration of the opposing longitudinal edges ends of this typical module 12, and of its integral depending leg 22. On the right hand, longitudinal end 16 is a sloped, L-shaped, transverse edge, which terminates in a rounded (beaded) projection 25, thus defining an elongate channel 27, provided along the first lateral length of the novel module. Spacer rib channel 27 is offset from the module sidewall by about 0.249 inches in one embodiment. The beaded projection 25 has a radius of 0.067 inches, while the channel 27 has a radius of 0.063 inches. The linear length of module 12 (FIG. 3) is typically 12 inches from right hand, bead 16 to left hand, beaded edge 31. The linear length of the spacer component itself, like, 22 is about 3.75 inches, from the modular outer sidewall surface 33 to the flared longitudinal foot end 27. Each of the spacer fastenings is adapted by flanging to be bonded to the inner panel 28, as depicted in FIG. 2, providing the extended Anchor points for all the panels.

Figure 4:
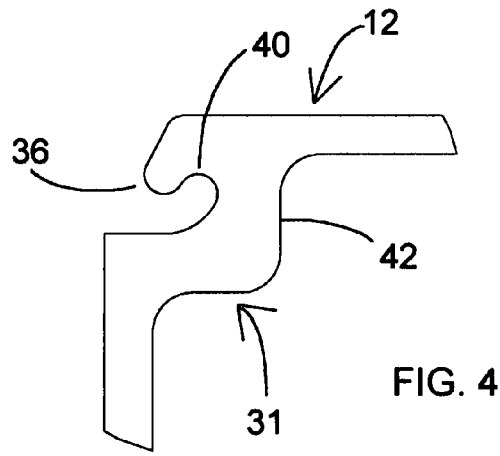
FIG. 4 is a broken out, enlarged sectional view of the left hand, opposing elongate edge/corner of one module, better depicting the recessed lip configuration, which lip is adapted to engage the abutting, and dissimilar, but mateable, complemental edge configuration of a second module for the invention.
Figure 5:
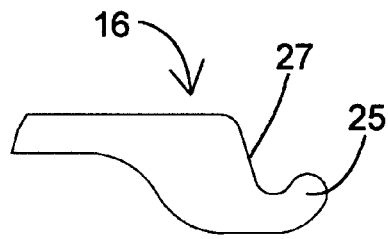
FIG. 5 is a broken-out, enlarged cross sectional view of the opposing right hand, linear edge of the second module of the present invention, depicting the forward sloped, L-shaped cross section, which is adapted to seat firmly in the ell-shaped recess of the abutting otherwise ell-shaped panel like module.

Looking now to FIG. 4, there is seen the somewhat complementary configuration of the left hand, longitudinal edge 31 of module 12 is seen. A downwardly, and outwardly, elongate bead 36 is integral with longitudinal edge 31 of module 12. Underlying, rounded bead 36 is a rounded recess 40, similarly sized to facilitate sliding engagement with the rounded bead 25 provided at the other transverse edge 25 of module 16 (See FIG. 3) as described above.

The diameter of depending lip 36 is 0.062 inches, that of recess 40 is 0.063 inches, and the overall depth of corner element 42 is 0.558 inches.

It will be evident that the opposing transverse beads of one module (like 12) are fully complementary, in cross-sectional configuration, with the beads on an abutting module (like 14).

Thusly, a second module (not shown) will slidingly engage with the left hand bead 31, (FIG. 6), and alignaock conveniently to present a short linear array of two abutting, but otherwise identically configured, modules, like 12 and 14, which are in interlocked, linear engagement.

Figure 6:
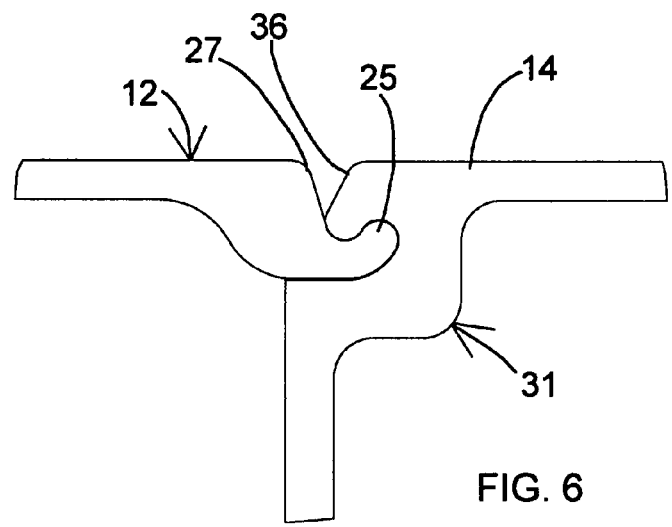
FIG. 6 is a broken-away, partial horizontal sectional view of the interlocking engagement of one pair of adjacent modular panels of this invention, aligned linearly, as they are to be seen in an assembled, smooth outer sidewall for a trailer.
Figure 7:
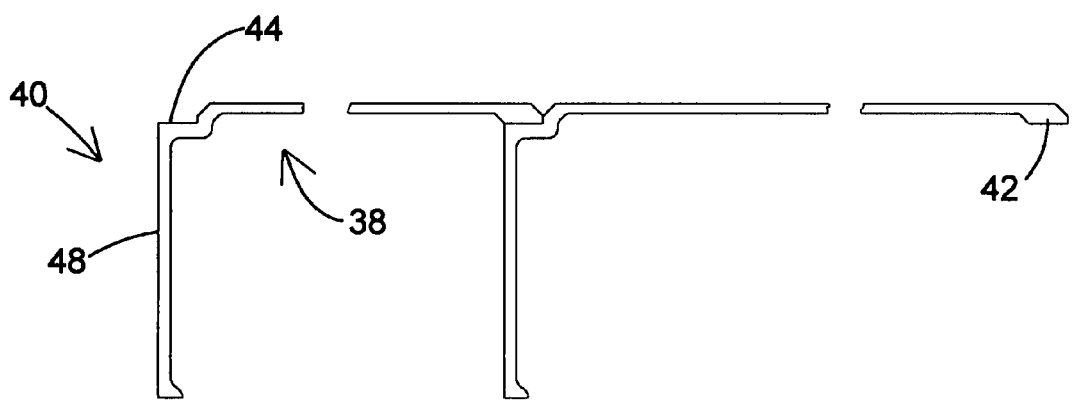
FIG. 7 is a horizontal cross-sectional view of pair of a prior art elongate modules, which are adapted to nest in overlapping edges, along with a dissimilar right angle, spacer element, provided integral of the left hand lateral edge.

FIG. 6 is a broken-away, partial horizontal sectional view of the interlocking engagement of one pair of adjacent modular panels of this invention, aligned linearly, as they are to be seen in an assembled, smooth outer sidewall for a trailer; and In FIG. 7, an exemplarily prior art sidewall, complemental edged pair of panels are depicted in 38 and 40, in which depending elongate lip 42 on the right side left hand panel 40 is configured so to engage slidingly with the ledge-shaped channel 44 on the adjoining, left side panel 38.

Note that the trailer sidewall erected from the known type of side panel, shown here has only as a single pair of interlocking internal members. The prior art modules 38/40, along with their overlapping linear engagement, each also having flanged free end legs, 46 and 48, respectfully, which are adapted to be bonded on an inner trailer sidewall, like the inner continuous wall 28, depicted in FIG. 2 above. Note however, that such an interleaving contact of this type of module longitudinal end configurations have no interlock feature. Thus, any vibration or jarring in transit will disrupt the panel joining, and disturb the intended sidewall planarity being sought with a composite array of modular panels. However, such planarity is maintained with the present invention.

In contrast, the interlocking edges of the present module configuration of the present invention provides for a smooth sided, elongate sidewall trailer, uniquely requiring only one configuration for the first linear edge of one lateral side of a panel module, and a complemental configuration for the second transverse edge on the opposing lateral side of the individual module.

We claim:

1. A first composite sidewall for a trailer having a continuous linear inside surface disposed in a first inner vertical plane and a linear outside planar surface disposed in a parallel first outer vertical plane, with the outer planar surface of the sidewall comprising a plurality of linearly arranged, interconnected and interlocked at least first and second modular panels, with each of the said panels having a complemental set of opposing parallel lateral lengths edges, which further comprising being adapted to provide encaseable opposed module keyways and being presented as follows:

(a) a first elongate length or a first module, presenting in cross-section, a first bead having a forward sloped L-shaped configuration terminating in a rounded projection, which configuration defines a shallow transverse channel throughout the first lateral length of the first module, with such first bead being adapted to slidingly and interlocking engage with;

(b) an abutting lateral length of a identically-constructed, second module, which second module presents an inverse sloped, L-shaped recess throughout the said module lateral length, also provided with a rounded projection, adapted to nest in the L-shaped recess of the abutting first module, so that when the two module edges are properly engaged, and interlocked, they present the an outside external surface which is substantially planar and throughout; and (c) a single right angle oriented, integral first spacer leg which extends from one of the lateral edges of the second panel module, which first leg is sized to provide an intended space dimensions between the inside surface of the first outer vertical plane and of an opposing inner surface of an outside array of interlocked panel modules, with the terminal end of each spacer leg being welded to the outer surface of the first vertical plane.

2. The first and second module assembly of claim 1 being load bearing as assembled with a plurality of like modules, interlocked as described above, and thus forming an elongate first sidewall of a cargo trailer, to which the modules are mounted and welded, having a variable horizontal lengths, of the first sidewall as needed.

3. The metallic module of claim 1 wherein the material of fabrication is of an extruded aluminum metal composition.

* * * * *